United States Patent
Dos Remedios et al.

(10) Patent No.: US 7,630,314 B2
(45) Date of Patent: Dec. 8, 2009

(54) METHODS AND SYSTEMS FOR DYNAMIC BANDWIDTH MANAGEMENT FOR QUALITY OF SERVICE IN IP CORE AND ACCESS NETWORKS

(75) Inventors: Rene Maria Buniel Dos Remedios, Muntinlupa (PH); Joel Cruz Delos Angeles, Binan (PH); Ma. Josefa Eliseeff, Paranaque (PH)

(73) Assignee: Latitue Broadband, Inc., Taguig (PH)

( * ) Notice: Subject to any disclaimer, the term of this patent is extended or adjusted under 35 U.S.C. 154(b) by 394 days.

(21) Appl. No.: 11/566,686

(22) Filed: Dec. 5, 2006

(65) Prior Publication Data
US 2008/0130495 A1    Jun. 5, 2008

(51) Int. Cl.
H04L 12/26    (2006.01)
(52) U.S. Cl. .................. 370/235; 370/229; 370/464; 370/465; 370/468
(58) Field of Classification Search ......... 370/223–232, 370/464–468; 709/223–226
See application file for complete search history.

(56) References Cited

U.S. PATENT DOCUMENTS

| | | | |
|---|---|---|---|
| 6,687,228 B1 * | 2/2004 | Fichou et al. | 370/232 |
| 6,751,664 B1 * | 6/2004 | Kogan et al. | 709/224 |
| 6,765,873 B1 * | 7/2004 | Fichou et al. | 370/235 |
| 6,931,011 B2 * | 8/2005 | Giacopelli et al. | 370/395.21 |
| 7,136,386 B2 * | 11/2006 | Allen et al. | 370/395.5 |
| 2006/0291473 A1 * | 12/2006 | Chase et al. | 370/395.5 |

* cited by examiner

Primary Examiner—William Trost, IV
Assistant Examiner—Charles C Jiang

(57) ABSTRACT

Proper allocation of network bandwidth is a crucial issue in rendering certain performance guarantees to meet the growing customer demands. Hence, allocation methodologies must explicitly be carried out for these guarantees to be given as efficiently as possible since the shared resources are limited. This invention presents methods and systems for Dynamic Bandwidth Management (DBM) and Quality of Service (QoS) in packet-based networks. DBM is an algorithm that dynamically adjusts the resource allocation in the IP Access Networks based upon measured QoS at the IP Core Network through an implementation of a Feedback Control Mechanism to manage available core transport bandwidth. Such a Feedback Control Mechanism is capable of maintaining a condition of non-congestion, a sufficient and necessary condition to meet end-to-end QoS requirements in a Next Generation Network (NGN). The emphasis is given on the system implementation of QoS policies for the fair distribution of network resources through a scalable architecture comprising key Resource and Admission Control Functional (RACF) entities, namely: a Network Management System (NMS), a QoS Manager, an Access Controller Manager (ACM), the Access Controllers, and the active probes.

20 Claims, 5 Drawing Sheets

METHODS AND SYSTEMS FOR DYNAMIC BANDWIDTH MANAGEMENT FOR QUALITY OF SERVICE IN IP CORE AND ACCESS NETWORKS

CROSS-REFERENCE TO RELATED APPLICATIONS

This application acknowledges the benefits of U.S. Pat. No. 6,765,873 entitled "Connections Bandwidth Right Sizing Based On Network Resources Occupancy Monitoring" by Fichou, et. al. filed on Jun. 29, 2000 and patented on Jul. 20, 2004, and U.S. Pat. No. 6,931,011 B2 entitled "Methods And Systems For Bandwidth Management In Packet Data Networks" by Giacopelli, et. al. filed on Jan. 31, 2001 and patented on Aug. 16, 2005.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM, LISTING COMPACT DISC APPENDIX

Not Applicable

BACKGROUND OF THE INVENTION

With the expansion of services and emerging applications being offered over the Internet, a dramatic growth in bandwidth utilization induces a quick depletion of network resources over a limited shared link. Simultaneously, excessively sporadic or bursty Internet Protocol (IP) traffic dominates the network and are constrained to the bottleneck of a pre-provisioned bandwidth commonly encountered at the backbone links, where a capacity mismatch usually exists. Such a capacity mismatch occurs when a backbone link has a lower capacity implementation than the total capacity of the access links aggregated to it. This scenario causes a substantial buildup of queues for access into a particular type of network bandwidth-requiring resource that could lead to data loss or dropped request/s if the buffers spill over. Since the basic IP architecture is not inherently capable to support quality of service (QoS), admission control and resource allocation become the fundamental issues that beset today's carriers or service providers in delivering a certain guaranteed quality of service (QoS) as a service differentiator and a measure of service availability. This QoS commitment may take the form of a minimum rate, known as a Committed Information Rate (CIR), while permitting the subscribers to burst up to some maximum rate, or Maximum Information Rate (MIR), latency, jitter, packet loss measures, or any combinations thereof.

Typical packet-based network architectures implement static provisioning of resources that tend to be insufficient in handling increased traffic flows. This inefficiency is due to over or under-allocated bandwidths as exemplified during events of aggressive bandwidth competition at the core transport network. Coincidently speaking, without the use of congestion control and fairness, the objective to maintain a level of QoS while improving or maximizing both resource utilization and network revenue will unlikely be realized.

It is therefore imperative to have improved methods and systems for delivering quality of service through an implementation of dynamic management of network resources with a feedback control mechanism in a packet-based network architecture. This scope of invention is an extension to U.S. Patent pending for approval, submitted by Dos Remedios, et. al., entitled "Methods and Systems for Providing Quality of Service in Packet-Based Core Transport Networks", with application number U.S. Ser. No. 11/463,908 filed on Aug. 11, 2006.

BRIEF SUMMARY OF THE INVENTION

An object of the present invention is to sustain congestion avoidance as both a necessary and sufficient requirement for quality-of-service (QoS) in a packet-based core and access transport networks.

The present invention relates generally to methods and systems for dynamically managing network resources by preventing a plurality of users from collectively exhausting a common backbone link, while guaranteeing an agreed level of service performance or maintaining a certain subscriber level of agreement (SLA). A Feedback Control Mechanism is implemented to keep the utilization of links within desired limits, thereby allowing the network to converge to a state of non-congestion. The Feedback Control Mechanism uses a Network Management System (NMS), a QoS Manager, an Access Controller Manager (ACM), the Access Controllers and the Active Probes, as an implementation of a total QoS provisioning system in accordance with independent claims itemized herein.

The method comprises the iterative steps of a QoS feedback control system, namely:

1, Monitoring of network activity of the core links via Active Probes. Determining the sources and destinations of traffic streams aggregated on the core links by various base stations or nodes by identifying their respective Access Controllers or other similar access control devices such as Broadband Remote Access Server (BRAS), Session Border Controller (SBC) or Service Selection Gateway (SSG);

2, When a core link exceeds a congestion threshold, an alert is sent out to the QoS Manager via the Network Management System as triggered by an Active Probe;

3, Based on the source or the destination of the traffic traversing a core link, the QoS Manager determines the top congested Access Controllers and will throttle traffic at the base stations that contribute to the core link congestion. The new enforced policy will override the default threshold bandwidth pipe settings of the Access Controller. The preceding steps comprise the method of QoS management in the core. QoS management in the access network, meanwhile, is implemented correspondingly in a recursive manner by adjusting the bandwidth pipe settings of sectors or groups under a certain backhaul pipe. The QoS management in the Access Network can be implemented in a Dynamic fashion by the implementation of various algorithms that can selectively throttle IP traffic in different Access Network elements based on current IP Traffic state information or IP Traffic state history in specific Access Network elements;

4, When the traffic condition on the core link goes below the congestion threshold, the QoS Manager will recall the newly enforced policy and the Access Controller will revert to the default or to the most recent bandwidth adjustment setting. A hysteresis gap can be implemented in defining the congestion threshold to ensure stability in the feedback control system.

The advantages of the invention include a scalable network architecture, efficient use of resources, reasonable implementation cost and stringent quality of service control.

These and other aspects of the present invention may be further understood by reference to accompanying drawings and the following detailed description.

BRIEF DESCRIPTION OF THE SEVERAL VIEWS OF THE DRAWINGS

The drawings below serve to better illustrate the embodiments presented in this paper. However, they are not to be construed as limiting the invention.

DETAILED DESCRIPTION OF THE INVENTION

Figure 1:
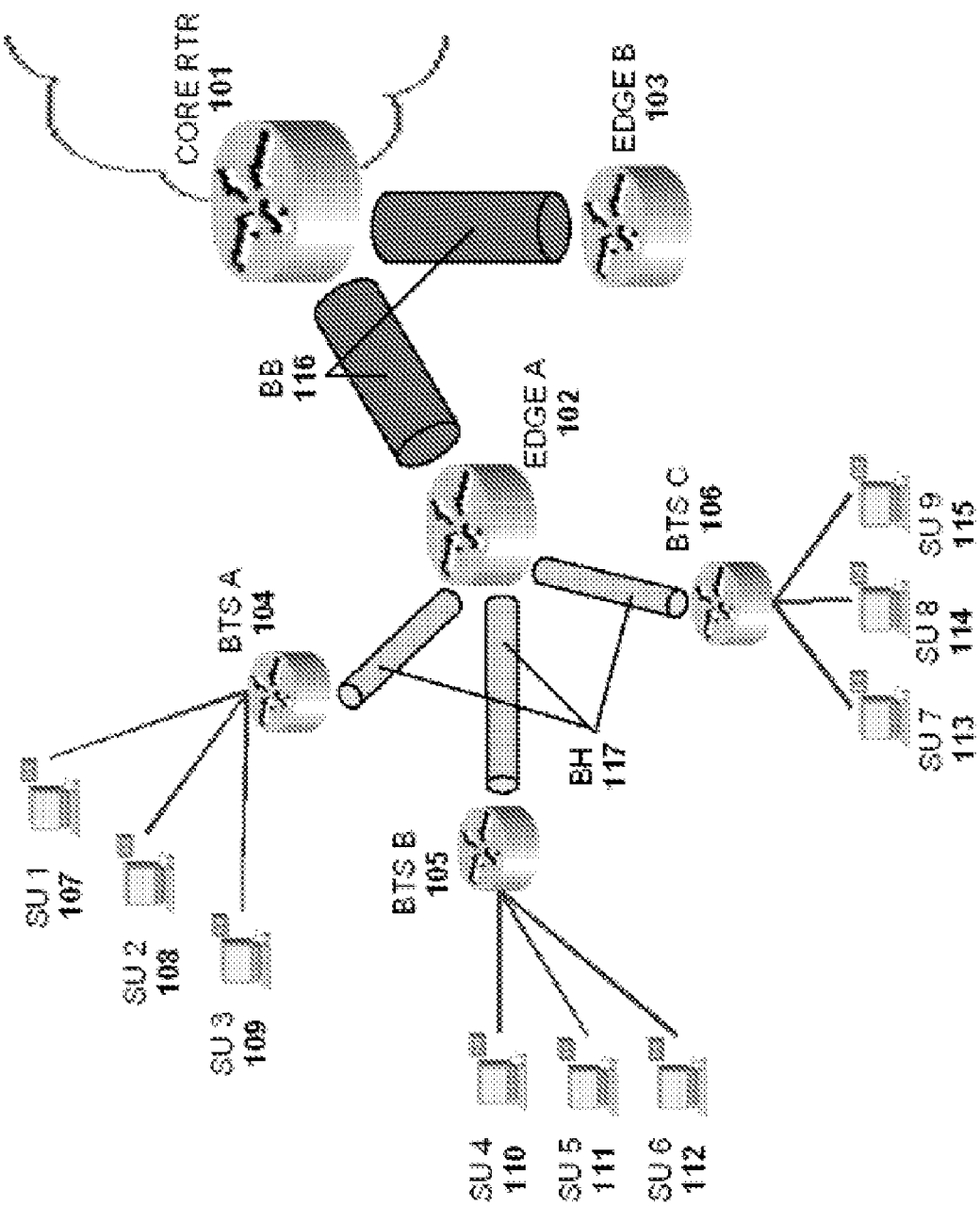
FIG. 1 is a simplified illustration of a hierarchical packet-based network topology with link-sharing properties, whose aggregation points serve as contention for resource.
Figure 2:
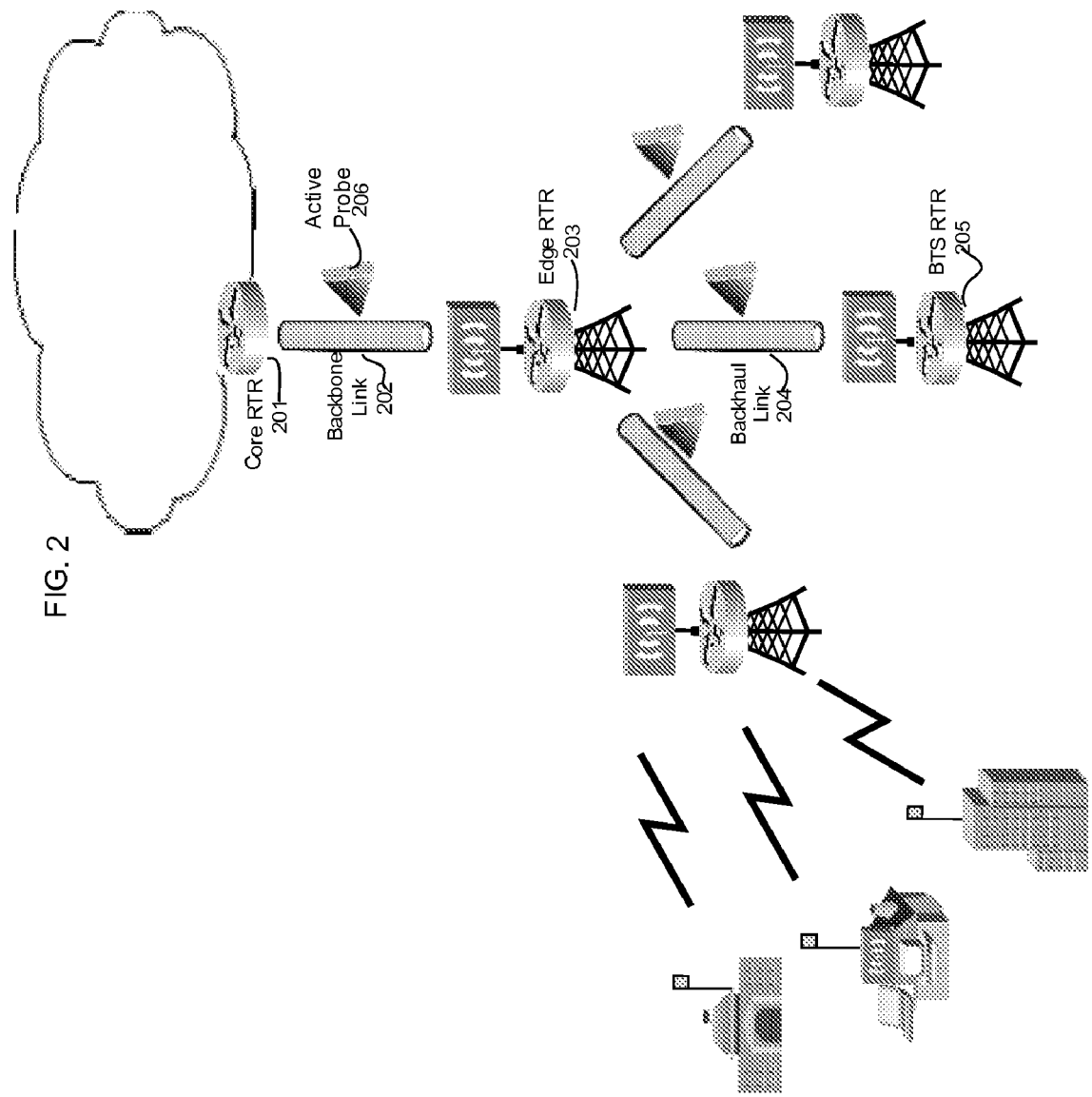
FIG. 2 shows a distinctive active probing emplacement.

As illustrated in FIG. 1, a typical model of a distributed hierarchical packet-based network is made of several user networks under respective base stations whose backhaul links 117 terminate at contention nodes of an edge router 102 to pass packet streams that carry information through a limited and shared backbone link 116 in order to access a particular bandwidth-requiring resource at the Internet network. These nodes located at every base station, edge and core aggregation points route IP traffic such as voice, data, video, etc. to and from adjacent transport links. Since the IP network needs to sustain a state without congestion as a necessary and sufficient means to guarantee QoS, all traffic traversing through these transport links must be monitored and checked by a distribution of Active Probes 206, which may possibly be situated across several links as shown in FIG. 2 whose nodes may be triggered as chokepoints during heavy Internet traffic peaks or contentions. The Active Probes 206 are responsible for determining link status on whether or not it is nearing congestion and violating a designed or measured QoS setting/s, through an inspection and measurement of QoS parameters such as latency, packet loss and link utilization. The Active Probes 206 also gather the source and destination addresses of the packets traversing the link under observation and store this information in the NMS system 307 so that the NMS system 307 will be able to identify the specific Access Controllers 305 or Access Devices that are contributing to the link traffic. The Active Probes 206 may also gather additional protocol information about the IP traffic that can likewise be used in addition to the traffic conditions to construct QoS management decisions.

The essential focus of the invention is the efficient management of resources for which link congestion states must first be reported by the Active Probe 306 as exceeding a certain utilization threshold, say at $T_1=90\%$, with a list of IP addresses or set of identifiers contributing to the said limit. Active Probes 310 send this report to the Network Management System (NMS) 307, consisting of a database for its administration and resource mapping through an awareness of network topology, network entities and traffic conditions and other protocol load conditions. The NMS 307 then identifies from the summary of IP addresses or identifiers given by the Active Probe 306, which access controller/s 305 which may be located at every node as specified above, have violated the given utilization threshold or an intended QoS setting at the Access Controller 305. It is worth to note that the succeeding methods relate to upstream or downstream utilization data being provisioned in disparate events. The NMS 307 then further quantifies the Access Controller congestion levels using various schemes that relate to certain network statistics profiles and forecast analysis criteria versus the actual data traffic for deriving accurate network link utilization status. Such schemes that may be effected are as follows: (1) computation of total sold Committed Information Rate (CIR) and/or maximum Maximum Information Rate (MIR); (2) determining actual traffic in the Access Controller or whether; (3) a statistical metric that is monitored for when it crosses a designed QoS measurement threshold, such statistical metric may be a simple moving average (SMA) which introduces delay, an exponential moving average (EMA) that tend to heighten small movements while flattening big or drastic rate of traffic flows, or a weighted distribution function which may use a proportional integral and exponential-type controller, etc.; (4) calculated packet losses or latencies; (5) distribution of the type of traffic based on the protocol or specific OSI layer 7 application emanating from the Access Controller 305; (6) absolute amount of traffic, and (7) other strategies to set priorities and levels for bandwidth management implementation. All of which schemes derived or obtained at the time reported by the Active Probe/s 306.

An alert condition is ascertained following the quantitative and/or qualitative schemes identified antecedently. If the NMS 307 has confirmed that no Access Controller 305 from its list as was reported by the Active Probe/s 306, has violated a QoS setting for such specific list of identified Access Controller/s 305, no alert shall be sent to the QoS Manager 308; thereby discarding or filtering out and possibly placing under a "light-tagged" or non-critical watchlist, this list of Access Controller/s 305 previously alerted by the Active Probe/s 306; while if a QoS setting violation for the specific Access Controller 305 has indeed occurred, an alert will be triggered and the specific Access Controller 305 will be added to a list of congestion-affecting Access Controllers 305 that will be directed by the NMS 311 to the QoS Manager 308, a software module independent of or residing within the NMS. The QoS Manager 308 makes use of the knowledge on utilization threshold violations and other pertinent information for bandwidth management obtained from the NMS 307, to form resource management decisions based on designed core QoS policies.

The actual method for selecting from a list of Access Controllers 305 to dynamically bandwidth manage may vary since this can also take into account the order or sequencing of reports 310 generated by the Active Probe/s 306 to the NMS 307. Furthermore, the selection of an appropriate algorithm is also determined with respect to set of requirements or criteria which may involve careful consideration of various factors. However, such selection may also be done using a priority or a random list wherein a medium case of bandwidth managing Access Controllers 305 one-at-a-time may be effected or a worst case scenario of bandwidth managing all Access Controllers 305 at the same instance until congestion levels are alleviated.

An example of a method for deriving a priority list is presented in detail below. After alerting the QoS Manager 308 about a possible QoS violation in a specific link 302, the NMS

307 then computes each congestion-affecting Access Controller's 305 utilization gain with respect to its own total sold customer CIRs or maximum MIR at the time reported by the Active Probe 306. This function is given by the formula:

$$G = \frac{U}{Q}$$

where: G=link utilization gain wrt total sold customer CIRs or maximum MIR
U=link utilization
Q=MAX [ΣCIR*A, MAX [MIR]] (at the congestion-affecting Access Controllers)
A=Allowance value e.g. 160%

NMS 307 queries the link utilization, U, from its database while obtaining the calculated value of Q from an Access Controller Manager (ACM) 309, a web-based administration tool that systematically manipulates access transport functions over a number of distributed Access Controllers 305 for Authentication, Authorization and Accounting. It issues commands 313 to Access Controllers 305 representative of network design criteria and security measures that both translate from user profiles for network authentication, daily network activity monitoring and implementation study.

Once the QoS Manager 308 has received 311 the alert and list of congestion-affecting Access Controllers 305 from the NMS 307, the QoS Manager 308 ranks in descending order (high to low) this list in level of priority for dynamic bandwidth management using G, (whose value can be queried from the NMS 307). The Access Controllers 305 belonging at the top ranking, say at 20% of the list, will be included in the computation of the QoS Manager 308 for deriving their new respective backhaul bandwidth settings, C. This is calculated using the sample derived equation below:

$$C = U - [(G/\Sigma G)*(S*B)]$$

where: C=new backhaul pipe bandwidth setting
U=backhaul utilization
G=link utilization gain wrt total sold customer CIRs or maximum MIR
S=capacity step down, %
B=backbonk link capacity The expression above indicates that for a given set of top-ranking Access Controllers 305, say at 20%, each will be throttled to implement the new backhaul bandwidth setting, C, as computed by the QoS Manager 308. This C value overrides the default bandwidth setting to ensure proper allocation of resources especially when links are nearing congestion. Those included in the top 20% are given priority for bandwidth adjustment since there are relatively fewer clients homed or relatively less bandwidth sold, not to mention having low cumulative Q, while at the same time having bursting utilizations, whose excess bandwidths can conversely be re-allocated to congesting links of a significantly populated or relatively high Q-requiring base station Access Controllers 305. Moreover, the parameter S in the equation is used to ensure that a step down value be distributed based on a selection criteria among the congestion-affecting Access Controllers 305. An example is that if the utilization has exceeded the threshold value, the QoS Manager 308 determines how much of the current high utilization must be brought or stepped down to make the usage levels reach an acceptable range.

Exception to the implementation of the new backhaul setting, C, however, is if Q>C 402. When this occurs, Q 403 must take precedence over C. Otherwise, the implementation of C will violate subscriber SLAs i.e. CIR and/or MIR corresponding to the desired level of service performance. And since, the goal of providing QoS means to be able to deliver needed bandwidth or resources as subscribed in terms of a minimum Committed Information Rate (CIR) and/or burst up to a Maximum Information Rate (MIR), these QoS parameters should always be sustained and regarded. Likewise when all congestion-affecting Access Controllers 305 cannot be reduced to C because of the tendency to violate the Q-rule 403, the backbone link 302 associated to these Access Controllers 305 only proves to be in dire need of an upgrade to cope with increased IP traffic demands. However, as in the case of a backbone link 305 reaching a utilization threshold or limit being alerted for an upgrade does not necessarily mean its Access Controllers 305 cannot be dynamically bandwidth-adjusted. Dynamic bandwidth management 404 is crucial for those links nearing congestion and proper apportioning of resources while maintaining the Q-rule shall warrant an optimized network performance.

Figure 3:
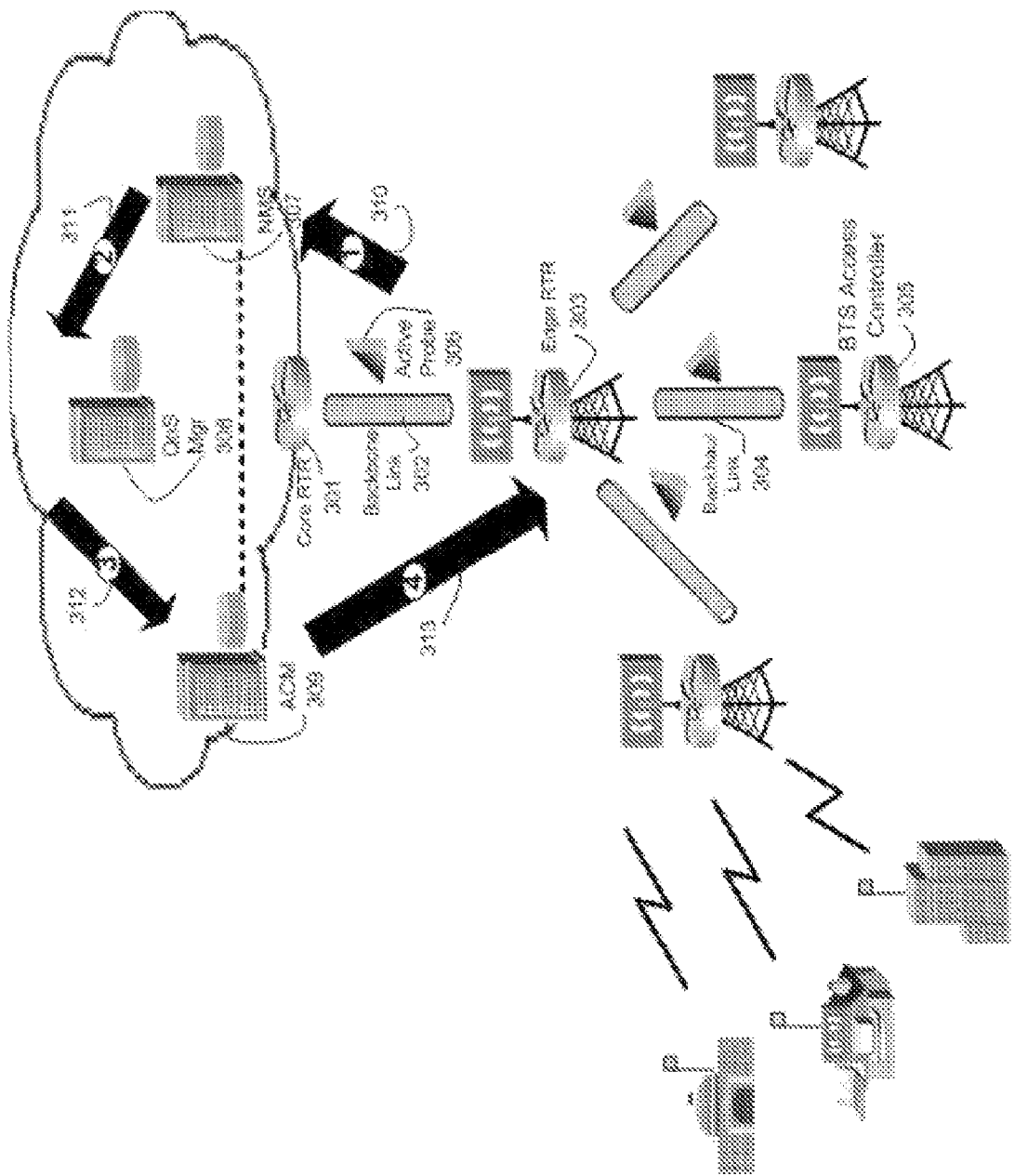
FIG. 3 illustrates the QoS Feedback Control System for efficient resource management.
Figure 4:
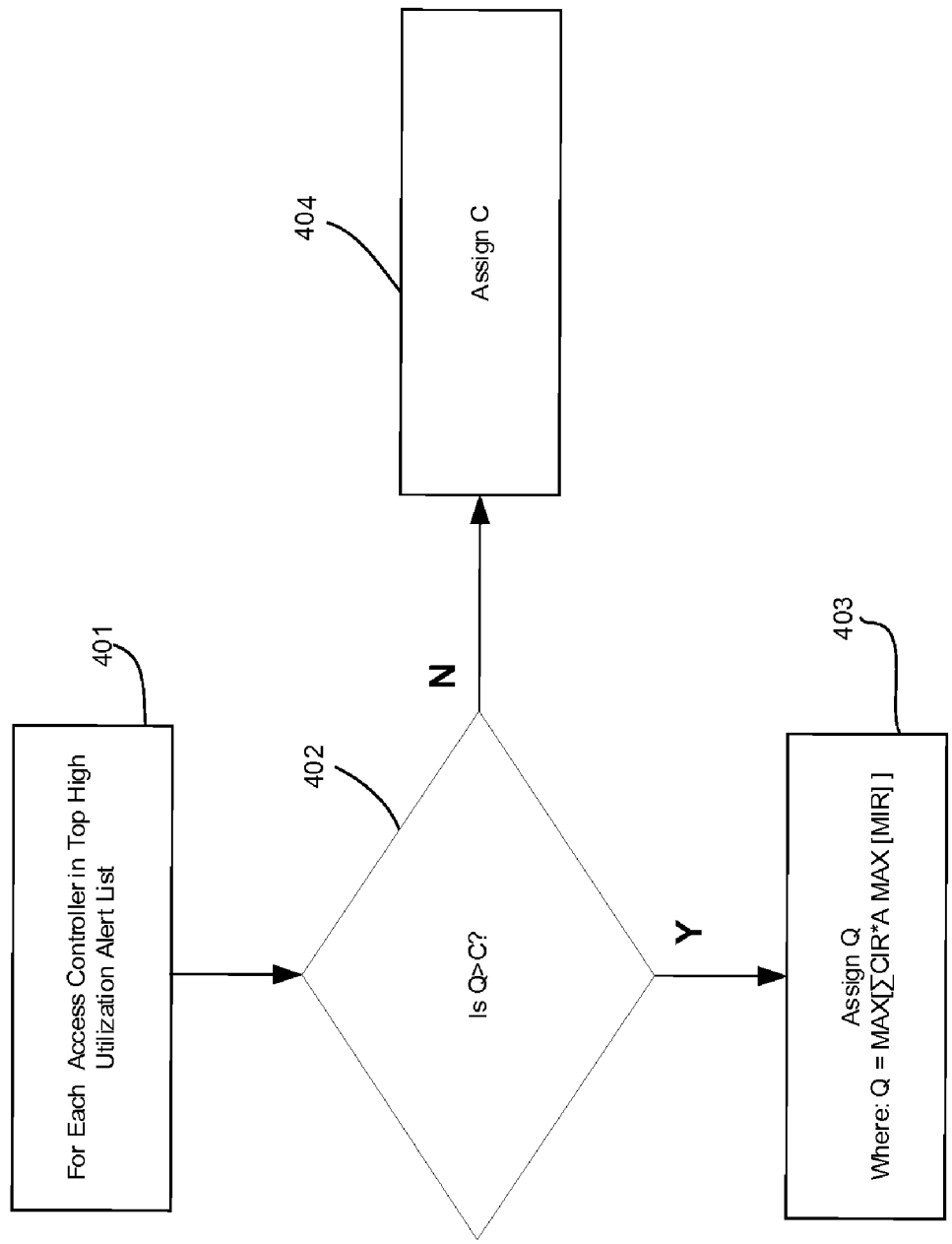
FIG. 4 is a flowchart for policy control decision used by the QoS Manager to each identified high utilization access controllers to ensure that any bandwidth pipe adjustment does not violate the Service Level Agreement (SLA) or the desired level of service performance.

New sector bandwidth distribution on the other hand is computed using the formula:

$$S_{BW}(\text{Rate}) = C * \frac{\left(\sum CIR_{sec}\right)}{\left(\sum CIR_{bts}\right)}$$

and $$S_{MIR}(\text{Ceiling}) = C$$

where: $S_{BW}$(Rate)=new sector CIR
C=new backhaul pipe bandwidth setting
$CIR_{sec}$=sector CIR
$CIR_{bts}$=base station CIR
$S_{MIR}$ (Ceiling)=new sector MIR Once the appropriate backhaul settings have been derived, either C or Q, the QoS Manager 308 instructs 313 respective Access Controllers 305 to implement such bandwidth pipe policy settings via the Access Controller Manager (ACM) 309. The management of the Access Controllers 305 can be implemented recursively. For example, an Access Controller can be situated at the core node 301, which can then cascade QoS policies being directed by the ACM 309 to the next layer or hierarchy of Access Controllers, as in this case which can be the edge router 303, that in turn directs respective dynamic bandwidth adjustment settings to respective lower layer Access Controllers, now correspondingly found at the base station node Access Controller 305. The base station 305 then likewise adjusts bandwidth configurations of its group of clients or sectors as an implementation of a non-congestion mechanism at the core and access IP-based network. Hierarchy of network topology however, may take more than two (2) layers. Monitoring of traffic and link status 310 will once again be performed and succeeding process for maintaining QoS measures to keep links non-congested is iteratively executed and forms a QoS feedback control system as depicted in FIG. 3.

Figure 5:
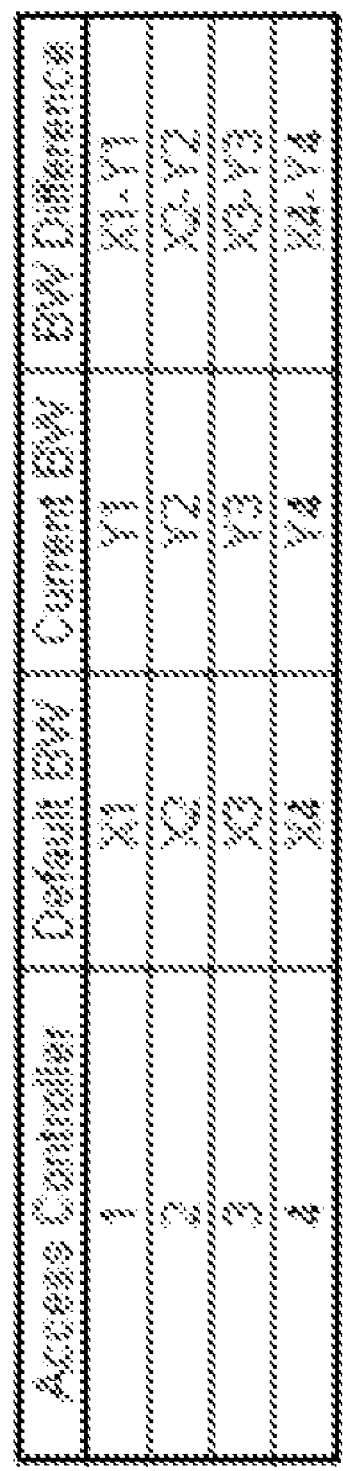
FIG. 5 is a table of dynamically adjusted Access Controllers maintained by the QoS Manager.

Additionally, for those Access Controllers 305 whose backhaul bandwidth pipes 304 were dynamically adjusted, however, the monitoring window duration is increased or sampling rate is decreased to ascertain stable optimization of network performance. When the backbone link 302 of these dynamically adjusted Access Controllers 305 has been verified by the NMS 307 as going below a second utilization threshold, $T_2$, set for hysteresis say at a stricter 70%, the QoS Manager 308 looks up at its database of dynamically bandwidth-adjusted Access Controllers 305 under the said backbone link 302 and computes by summing up the difference between previous and/or most recently dynamically adjusted bandwidths to reach (but not necessarily equal to) the percentage of the backbone link 302 capacity to be distributed. A sample table of dynamically adjusted Access Controllers 305 maintained by the QoS Manager 308 is illustrated in FIG. 5. All the Access Controllers 305 that satisfy the step-up utilization criteria will be reverted to its default (if dynamically bandwidth-adjusted once) or to the most recent assigned backhaul pipe 304 bandwidth setting to collectively increase backbone link 302 utilization to a value, $T_2 \leq X < T_1$.

Where: X=step up utilization value
  $T_1$=utilization threshold 1, e.g. 90%
  $T_2$=utilization threshold 2, e.g. 70%

It is worth noting that the concept of dynamic bandwidth management to provide QoS in IP core and access networks deals with the fact that a user may be able to achieve good levels of QoS like an acceptable throughput, latency and packet loss, etc. while maintaining its SLA or agreed level of service performance, if the network operates under favorable conditions. However, as this invention addresses proper allocation of network resources under aggressive traffic contention under limited and shared transport links, there may be instances wherein this ideal bandwidth management scheme operates at best-effort QoS. This means that the system can implement a pseudo-optimal rule to do bandwidth management during instances when the network has been under-designed, over-provisioned, and/or affected by a link failure, that in turn, could inflict severe degradation and even destabilize overall network performance. Under these adverse circumstances, the IP network will most expectedly violate set of QoS policies in the aforementioned.

The invention claimed is:

1. A method for dynamic management of bandwidth settings of a plurality of congestion-affecting access controllers in a packet-based network, said packet-based network comprising:
  a core transport network having a plurality of backbone links, each of the backbone links being connected to a core node, the core nodes being connected to a plurality of access controllers via backhaul links,
  an access network having said plurality of access controllers, each of the access controllers in a base station being connected to a plurality of subscriber terminals via sectors of said base station and performing resource and admission control functions, each of the subscriber terminals being assigned a committed information rate CIR and a maximum information rate MIR which are managed by said access controllers,
said method comprising:
  a. providing a network management system which computes a link utilization gain G of each said congestion-affecting access controllers with respect to a total sum of subscriber CIR or a highest subscriber MIR associated with the congestion-affecting access controller, according to a following formula:

$$G = \frac{U}{Q}$$

with U denoting a backhaul link utilization of the congestion-affecting access controller and $Q = MAX[\Sigma CIR * A, MAX[MIR]]$ with $\Sigma CIR$ denoting the total sum of subscriber CIR associated with the congestion-affecting access controller, A denoting a predetermined allowance value, and MAX[MIR] denoting the highest subscriber MIR associated with the congestion-affecting access controller, where the subscriber CIR and MIR values are obtained from an access controller manager;
  b. providing a quality-of-service manager which will:
    i. receive a list of said congestion-affecting access controllers with their respective G values from said network management system and sort said list in descending order based on the G values;
    ii. compute a new backhaul bandwidth setting C for each of top-ranking congestion-affecting access controllers that belong to a predetermined upper percentage of the sorted list of congestion-affecting access controllers based on the G values, according to a following formula:

$$C = U - \left[ \frac{G}{\Sigma G} * S * B \right]$$

with $\Sigma G$ representing a sum of the link utilization gains of said top-ranking congestion-affecting access controllers, S representing a predetermined capacity step down percentage, and B representing a backbone link capacity;
  c. maintaining a plurality of subscriber service level agreements during a dynamic bandwidth adjustment of said top-ranking congestion-affecting access controllers by:
    i. adjusting backhaul bandwidth setting of each said top-ranking congestion-affecting access controllers to C if C is greater than or equal to Q;
    ii. adjusting said backhaul bandwidth setting of each said top-ranking congestion-affecting access controllers to Q if C is less than Q;
  whereby said dynamic management of said bandwidth settings of said plurality of congestion-affecting access controllers in said packet-based network will maintain a condition of non-congestion in said core transport network and thus provide quality of service in said packet-based network.

2. The method of claim 1, further including adjusting a plurality of sector bandwidth settings of each said top-ranking congestion-affecting access controllers during said dynamic bandwidth adjustment by:
  a. computing a plurality of new sector CIR $S_{BW}$(Rate) for each of said top-ranking congestion-affecting access controllers according to a following formula:

$$S_{BW}(\text{Rate}) = C * \frac{\sum CIR_{sec}}{\sum CIR_{bts}}$$

with $\Sigma CIR_{sec}$ indicating a sum of subscriber CIR associated with the sector of the base station managed by the top-ranking congestion-affecting access controller and $\Sigma CIR_{bts}$ indicating a total sum of subscriber CIR associated with the base station managed by the top-ranking congestion-affecting access controller;
  b. adjusting a plurality of sector CIR of each said top-ranking congestion-affecting access controller to $S_{BW}$(Rate);
  c. adjusting a plurality of sector MIR of each said top-ranking congestion-affecting access controller to C.

3. The method of claim 1, wherein said congestion-affecting access controllers associated with a congested backbone or backhaul link are determined by utilizing said network management system in analyzing a list of network identifiers of packets traversing said congested backbone or backhaul link, said list of network identifiers is obtained by active probes monitoring each of the backbone or backhaul links.

4. The method of claim 3, wherein said congested backbone or backhaul link is the backbone or backhaul link where network traffic condition thereof as monitored by said active probes exceeds a first predetermined congestion threshold setting.

5. The method of claim 4, wherein said network traffic condition includes link utilization, latency and packet loss.

6. The method of claim 1, wherein said top-ranking congestion-affecting access controllers belong to upper 20% of the sorted list of congestion-affecting access controllers based on the G values.

7. The method of claim 1, wherein said adjusting said backhaul bandwidth setting of each said top-ranking congestion-affecting access controllers is performed on one access controller at a time.

8. The method of claim 1, wherein said adjusting said backhaul bandwidth setting of each said top-ranking congestion-affecting access controllers is performed simultaneously on all said top-ranking congestion-affecting access controllers.

9. The method of claim 1, further including notifying a network operator that the congested backbone or backhaul link requires a capacity upgrade when the backhaul bandwidth settings of said top-ranking congestion-affecting access controllers associated with the congested backbone or backhaul link cannot be adjusted further since C is less than Q.

10. The method of claim 1, further including reverting the bandwidth settings of said top-ranking congestion-affecting access controllers to their previous or default settings when said network traffic condition on the backbone or backhaul link, where said top-ranking congestion-affecting access controller are associated, is below a second predetermined congestion threshold setting.

11. A dynamic bandwidth management system for use on a plurality of congestion-affecting access controllers in a packet-based network, said packet-based network comprising:
   a core transport network having a plurality of backbone links, each of the backbone links being connected to a core node, the core nodes being connected to a plurality of access controllers via backhaul links,
   an access network having said plurality of access controllers, each of the access controllers in a base station being connected to a plurality of subscriber terminals via sectors of said base station and performing resource and admission control functions, each of the subscriber terminals being assigned a committed information rate CIR and a maximum information rate MIR which are managed by said access controllers,
said dynamic bandwidth management system comprising:
   a. a network management system which computes a link utilization gain G of each said congestion-affecting access controllers with respect to a total sum of subscriber CIR or a highest subscriber MIR associated with the congestion-affecting access controller, according to a following formula:

$$G = \frac{U}{Q}$$

with U denoting a backhaul link utilization of the congestion-affecting access controller and $$Q = \text{MAX}[\Sigma \text{CIR}*A, \text{MAX}[\text{MIR}]]$$

with $\Sigma$CIR denoting the total sum of subscriber CIR associated with the congestion-affecting access controller, A denoting a predetermined allowance value, and MAX[MIR] denoting the highest subscriber MIR associated with the congestion-affecting access controller, where the subscriber CIR and MIR values are obtained from an access controller manager;
   b. a quality-of-service manager which will:
      i. receive a list of said congestion-affecting access controllers with their respective G values from said network management system and sort said list in descending order based on the G values;
      ii. compute a new backhaul bandwidth setting C for each of top-ranking congestion-affecting access controllers that belong to a predetermined upper percentage of the sorted list of congestion-affecting access controllers based on the G values, according to a following formula:

$$C = U - \left[\frac{G}{\Sigma G} * S * B\right]$$

with $\Sigma$G representing a sum of the link utilization gains of said top-ranking congestion-affecting access controllers, S representing a predetermined capacity step down percentage, and B representing a backbone link capacity;
   c. means for maintaining a plurality of subscriber service level agreements during a dynamic bandwidth adjustment of said top-ranking congestion-affecting access controllers by:
      i. adjusting backhaul bandwidth setting of each said top-ranking congestion-affecting access controllers to C if C is greater than or equal to Q;
      ii. adjusting said backhaul bandwidth setting of each said top-ranking congestion-affecting access controllers to Q if C is less than Q;
      whereby said dynamic bandwidth management system will maintain a condition of non-congestion in said core transport network and thus provide quality of service in said packet-based network.

12. The dynamic bandwidth management system of claim 11, further including means for adjusting a plurality of sector bandwidth settings of each said top-ranking congestion-affecting access controllers during said dynamic bandwidth adjustment by:
   a. computing a plurality of new sector CIR $S_{BW}$(Rate) for each of said top-ranking congestion-affecting access controllers according to a following formula:

$$S_{BW}(\text{Rate}) = C * \frac{\sum CIR_{sec}}{\sum CIR_{bts}}$$

with $\Sigma CIR_{sec}$ indicating a sum of subscriber CIR associated with the sector of the base station managed by the top-ranking congestion-affecting access controller and $\Sigma CIR_{bts}$ indicating a total sum of subscriber CIR associated with the base station managed by the top-ranking congestion-affecting access controller;

b. adjusting a plurality of sector CIR of each said top-ranking congestion-affecting access controller to $S_{BW}$ (Rate);

c. adjusting a plurality of sector MIR of each said top-ranking congestion-affecting access controller to C.

13. The dynamic bandwidth management system of claim 11, wherein said congestion-affecting access controllers associated with a congested backbone or backhaul link are determined by utilizing said network management system in analyzing a list of network identifiers of packets traversing said congested backbone or backhaul link, said list of network identifiers is obtained by active probes monitoring each of the backbone or backhaul links.

14. The dynamic bandwidth management system of claim 13, wherein said congested backbone or backhaul link is the backbone or backhaul link where network traffic condition thereof as monitored by said active probes exceeds a first predetermined congestion threshold setting.

15. The dynamic bandwidth management system of claim 14, wherein said network traffic condition includes link utilization, latency and packet loss.

16. The dynamic bandwidth management system of claim 11, wherein said top-ranking congestion-affecting access controllers belong to upper 20% of the sorted list of congestion-affecting access controllers based on the G values.

17. The dynamic bandwidth management system of claim 11, wherein said means for maintaining said subscriber service level agreements during said dynamic bandwidth adjustment of said top-ranking congestion-affecting access controllers, adjusts the backhaul bandwidth settings of said top-ranking congestion-affecting access controllers one at a time.

18. The dynamic bandwidth management system of claim 11, wherein said means for maintaining said subscriber service level agreements during said dynamic bandwidth adjustment of said top-ranking congestion-affecting access controllers, adjusts the backhaul bandwidth settings of all said top-ranking congestion-affecting access controllers simultaneously.

19. The dynamic bandwidth management system of claim 11, further including means for notifying a network operator that the congested backbone or backhaul link requires a capacity upgrade when the backhaul bandwidth settings of said top-ranking congestion-affecting access controllers associated with the congested backbone or backhaul link cannot be adjusted further since C is less than Q.

20. The dynamic bandwidth management system of claim 11, further including means for reverting bandwidth settings of said top-ranking congestion-affecting access controllers to their previous or default settings when said network traffic condition on the backbone or backhaul link, where said top-ranking congestion-affecting access controller are associated, is below a second predetermined congestion threshold setting.

* * * * *